Aug. 12, 1969    W. A. THORNTON, JR    3,460,962
POLYCHROMATIC LUMINESCENT DEVICES AND METHOD OF MANUFACTURE
Filed March 21, 1966

WITNESSES
Theodore F. Wrobel
Paul Pintzel

INVENTOR
William A. Thornton, Jr.
BY
W. D. Palmer
ATTORNEY

United States Patent Office 3,460,962
Patented Aug. 12, 1969

3,460,962
POLYCHROMATIC LUMINESCENT DEVICES AND
METHOD OF MANUFACTURE
William A. Thornton, Jr., Cranford, N.J., assignor to
Westinghouse Electric Corporation, Pittsburgh, Pa., a
corporation of Pennsylvania
Filed Mar. 21, 1966, Ser. No. 535,832
Int. Cl. C09k 1/20
U.S. Cl. 117—33.5                            15 Claims

ABSTRACT OF THE DISCLOSURE

A polychromatic luminescent device having a single heterogeneous layer of phosphor material and a method of preparing same is detailed. The layer of phosphor material comprises a first matrix constituent and a second matrix constituent diffused therein in relative proportions which vary progressively across the depth dimension of the phosphor layer, thus forming the single heterogeneous layer. The color of the light emitted by the luminescent layer is a function of the relative concentration of the first matrix constituent to the second matrix constituent at the depth a which the phosphor layer is excited. A predetermined color response is had by varying the electron energy of the excitation electrons and thus varying their relative depth penetration of the phosphor layer.

---

This invention relates generally to polychromatic luminescent devices and, more particularly, to such devices having a single layer of phosphor material.

Polychromatic luminescent devices which use separate superimposed layers of different phosphor materials are known in the art. Heretofore, such polychromatic luminescent devices have been made by sequentially depositing on a substrate two or more phosphor layers. Each layer emitted a different single primary color when excited. The desired color combination was produced by combining two or more primary colors emitted as a result of exciting two or more phosphor layers in the appropriate proportions. The manufacture of these multilayered devices requires separate depositing (and sometimes activating) steps for each layer. The thickness of each layer adds to the total thickness which often is critical. Chemical reactions between the phosphors of adjacent layers must be avoided. If the indices of refraction of the layers are not matched, optical interference effects will result. Also, the coefficients of thermal expansion must be matched or the phosphor layers flake off as successive layers are deposited and fired. These previous polychromatic phosphor layers provide only as many primary colors as there are separate layers deposited.

It is, therefore, an object of this inventiton to provide a polychromatic luminescent single-layer activated phosphor matrix.

It is a further object of this invention to provide a polychromatic luminescent phosphor layer having improved maintenance and color rendition and which can be manufactured in fewer steps and with fewer materials than heretofore.

It is another object of this invention to provide cathode ray tube apparatus having a polychromatic phosphor comprising a single layer which emits light of many different colors depending on the energy of the cathode ray.

It is yet another object of this invention to provide a polychromatic single layer phosphor which is responsive to atomic radiations.

It is an additional object of this invention to provide an improved method of forming a polychromatic heterogeneous phosphor matrix and activated phosphor matrix.

Briefly, these and other objects, which will become apparent as the description proceeds, are achieved by providing a substantially continuous single film activated phosphor matrix. The phosphor matrix is heterogeneous in composition and consists essentially of at least a first matrix constituent of the group consisting of cadmium sulfide and zinc selenide, and a second matrix constituent, such as zinc sulfide. The concentration of the first matrix constituent relative to the second matrix constituent in the phosphor matrix varies progressively across the depth dimension of the matrix, from (1) a high relative concentration near the outer surface thereof to (2) at most a low relative concentration towards the inner surface. The color of the light of luminescence emitted from the phosphor matrix is a function of the relative concentrations of the first matrix constituent relative to the second matrix constituent. The phosphor matrix emits light of predetermined and different colors under excitation by predetermined and different electron energies because of the corresponding difference in depth of penetration. The color of the emitted light depends on the relative concentrations of the first matrix constituent to the ZnS, at the depths at which the phosphor matrix is excited.

The present invention will become more apparent when considered in view of the following detailed description and drawings, in which.

Figure 1:
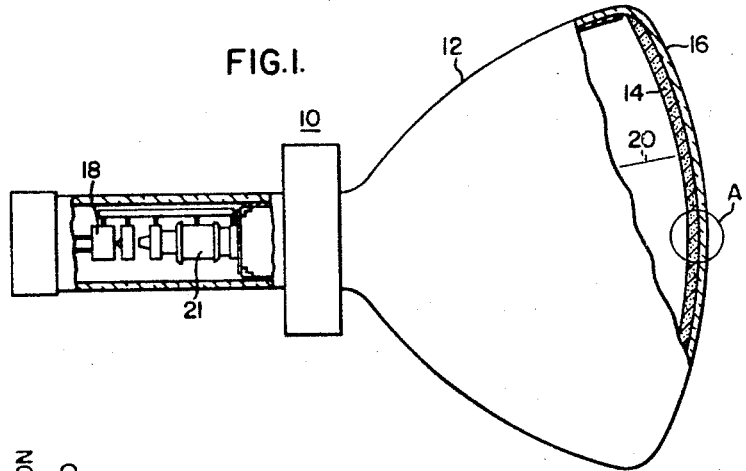
FIGURE 1 is an elevational view, partly in section, of a cathode ray tube device showing the single-layered phosphor film formed over the screen portion of the cathode ray tube.

Referring to FIG. 1, there is shown a partially cutaway view of a cathode ray tube 10 having an envelope means 12 preferably formed of glass. The anode or phosphor layer 14 is provided at one end of the tube 10, and is deposited over the inside surface of the light-transmitting glass screen or substrate 16. An electron source or cathode means 18 is provided at the other end of the tube 10 and is disposed toward the phosphor layer 14. The cathode 18 provides a scanning electron beam 20 which bombards and excites the phosphor layer 14 causing the emission of light therefrom. An electron beam accelerating means 21 is provided in order to vary the energy of the electron beam to obtain the desired emission color. With the exception of the novel phosphor layer 14, the tube 10 may be any conventional type cathode ray tube.

Figure 2:
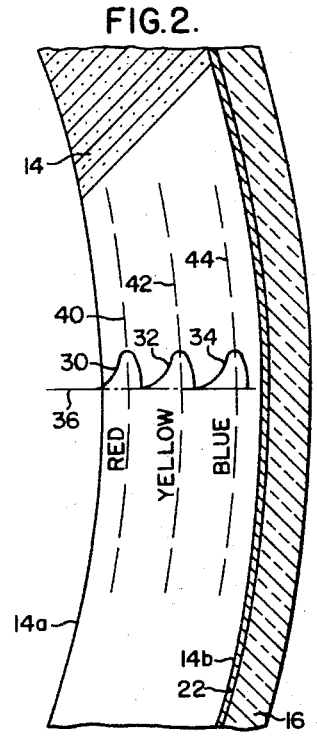
FIG. 2 is an enlarged fragmentary view, partly in section, of a portion of the phosphor film.

FIG. 2 shows in more detail the phosphor layer 14 carried on the substrate 16. This figure is an enlargement of the portion of FIG. 1 indicated by the letter A. The phosphor layer 14 has an outer surface 14a spaced from the substrate 16, and an inner surface 14b closer to the substrate 16. If necessary, a thin, transparent, electrically conducting film 22 may be disposed between the substrate 16 and the inner surface 14b of the phosphor layer 14. The conducting film 22 conducts the bombarding electrons 20 away from the phosphor layer 14 to prevent an electric charge from developing thereon. Among the materials which may be used for conducting layer 22 are tin oxide, gold, and copper iodide. However, tin oxide is preferred because of its conductive and light-transmitting properties. The phosphor layer 14 is formed by first depositing a film of for example ZnS, preferably from about 100 angstroms to about 10 microns thick, is vacuum deposited over the conducting layer 22 using conventional techniques. The relative dimensions of the phosphor layer 14, the substrate 16, and film 22 as shown in FIG. 2, have been distorted for purposes of presentation. The film is activated preferably by a well-known treatment firing process described in U.S. Patent No. 3,044,902, dated July 17, 1962. The phosphor matrix of layer 14 is preferably activated by at least one material of the group consisting of Ag, Cu and Au, and coactivated by at least one material from the group consisting of Cl, I, Br, Al, Ga, and In. The preferred activator and coactivator are Ag and Cl respectively.

Figure 3:
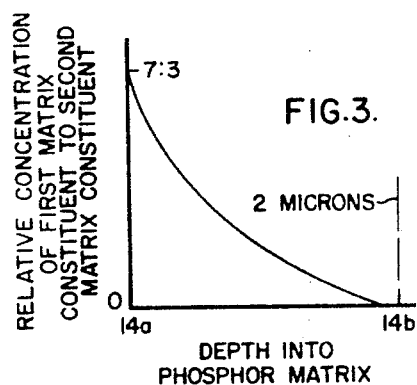
FIG. 3 is a graph of the relative concentration of the first matrix constituent relative to the second matrix constituent, plotted against the depth of the phosphor matrix.

FIG. 3 is a curve of the relative concentrations of the first matrix constituent to the ZnS (plotted on the ordinate), and the depth into the phosphor layer 14 measured from the outer surface 14a thereof (plotted along the abscissa), in one embodiment of the invention. The first matrix constituent has a high concentration relative to the outer surface 14a. The relative concentration progressively decreases towards the inner surface 14b. This progressive variation in relative concentration is achieved by diffusing the first matrix constituent into the ZnS film and is discussed in more detail later. The cathodoluminescence color of excited ZnS:Ag, Cl with no CdS or ZnSe is blue. The presence of a small percentage of the first matrix constituent (CdS or ZnSe) in combination with the zinc sulfide matrix will cause a green emission when excited. A somewhat higher concentration of the first constituent will cause a yellow emission and so forth through orange and red. In the embodiment wherein the first matrix constituent is cadmium sulfide, a relative concentration of about 7CdS:3ZnS produces a red emission and is preferred. Thus, every color of the spectrum may be obtained from this embodiment by varying the depth of electron excitation. In the embodiment wherein the first matrix constituent is zinc selenide, a 7:3 relative molar concentration produces an orange emission and therefore a somewhat higher relative concentration of the ZnSe with respect to the ZnS is preferred if all of the colors of the spectrum are desired.

Referring again to FIG. 2, the polychromatic luminescence is achieved by controlling penetration of electrons from electron beam 20 by means of the accelerator 21. Electron penetration curves 30, 32 and 34 roughly indicate the phosphor excitation at each penetration and the resulting color emission caused by three electron beams of progressively increasing energies. The amplitude of each penetration curve 30, 32 and 34, above the horizontal line 36, generally indicates the energy lost by the electron per unit distance traveled, that is, the intensity of phosphor excitation and light emission per unit depth. The observed color of light emitted for each electron is approximately that of the amplitudes 40, 42 and 44 of the penetration curves 30, 32 and 34 respectively. The visual effect of any visible color (between the inner surface 14b color and the outer surface 14a color) can be produced by varying the electron velocities.

Figure 4:
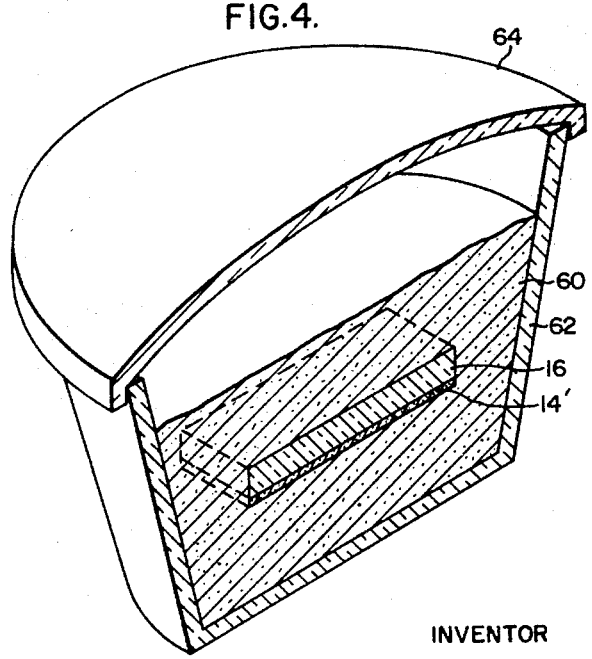
FIG. 4 is a perspective view, partly in section, of a ZnS film and substrate embedded in a powder during a step in the manufacture of the device.

One method of forming a heterogeneous phosphor matrix 14 is shown in FIG. 4. A zinc sulfide film 14' is deposited on a substrate 16, and exposed to a powder 60 which contains the elements Cd and/or Se for the first matrix constituent. Preferably, the powder 60 contains a substance which consists essentially of at least one material of the group consisting of Cd, CdS, (Zn, Cd)S, Se, ZnSe, Zn(S, Se), (Zn, Cd)Se, Cd(S, Se), (Zn, Cd) (S, Se), and CdSe. The powder 60 may be contained in a crucible 62 with cover 64, in which the film 14' and substrate 16 are embedded as shown in FIG. 4. If desired, the substrate 16 may be positioned with the film 14' facing upward and the powder 60 spread over the film.

In order to diffuse the first matrix constituent into the zinc sulfide film 14', the substrate 16, film 14' and powder 60 are heated or fired at a predetermined temperature for a predetermined time. As the first matrix constituent diffuses into the zinc sulfide film, the zinc sulfide film 14' becomes a heterogeneous phosphor having a progressively decreasing concentration of the first matrix constituent. The firing temperature may vary from about 600° C. to about 1200° C., and the firing period may vary from about 1 minute to about 1 hour. The firing time depends, among other things, on the thickness of the zinc sulfide film 14'. If the diffusion process is allowed to proceed too long, the first matrix constituent will saturate the zinc sulfide film 14', and will become evenly concentrated thereacross. In this case, varying the electron energy will not vary the emission color. If the diffusion period is too short, insufficient first matrix material will be diffused. The preferred diffusion period is the time required for the diffusing first matrix constituent to approach the inner surface of the zinc sulfide film 14'. This allows the maximum energy range for the bombarding electrons to produce the entire visible spectrum.

As a specific example, a zinc sulfide film was formed, by vacuum deposition, to a thickness of approximately 2 microns over a 2 inch by 2 inch substrate surface. The zinc sulfide film was activated by silver, and coactivated by chlorine. A ¼ inch layer of powdered (30Zn, 70Cd)S activated by Ag and coactivated by Cl was placed over the zinc sulfide film. Other thicknesses of course may be employed. The Ag and Cl were present in molar concentrations of $10^{-4}$ each. Other Ag and Cl concentrations may be employed. The substrate 16, zinc sulfide film 14', and powder 60 were heated in air for approximately 10 minutes at approximately 750° C. A nitrogen atmosphere may be employed during the heating, if desired. The Ag and Cl in the powder 60 prevented the Ag activator and Cl coactivator concentration near the outer surface of the zinc sulfide film 14' from decreasing due to the Ag and Cl diffusing out of the film 14' into the powder.

The resulting emission color of the phosphor layer 14 was red for the outer surface 14a and blue for the inner surface 14b. The middle portions of the phosphor layer 14 provided the intermediate colors. The red emission color of the outer surface 14a may be varied by varying the proportions of Zn and Cd in the (Zn, Cd)S powder 60. A decrease in the Cd concentration will shift the emission color of the outer surface 14a towards the orange. A decrease in the diffusion temperature or time will produce a similar orange shift. The orange emission in each case is caused by a lower relative concentration of CdS to ZnS at the outer surface 14a.

The materials (Zn, Cd)Se, Zn(S, Se), Cd(S, Se), and (Zn, Cd)(S, Se) may be substituted in the above example to obtain similar effects. The emission color of the outer surface 14a depends on the composition of the material, and on the temperature and time of firing, and may be varied in each case as described in the above example.

In the case of Cd, CdS, Se, ZnSe, and CdSe, the proportions of the components are fixed; the emission color of the outer surface 14a is controlled through shortening the diffusion time and lowering the diffusion temperature. These materials may also be substituted in the above example with similar results.

The zinc sulfide film 14' may be activated before the diffusion step described above, by a conventional activation step. If desired, however, the activation may be accomplished simultaneously with the diffusion of the first matrix. To accomplish the steps simultaneously, the powder 60 must also contain at least one of the activator and coactivator groups described hereinbefore. Further, the activation may be performed after the diffusion step.

Figure 5:
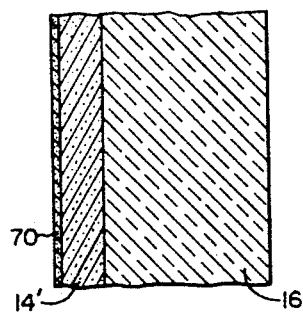
FIG. 5 is a fragmentary enlarged view, partly in section, showing a ZnS film and substrate during a step in an alternate embodiment of the method.

Referring to FIG. 5, an alternate method of diffusing the first matrix constituent is illustrated. Instead of using the powder 60, a layer 70 containing the first matrix material is employed. The layer contains at least one of the materials in the group hereinbefore described with respect to the powder 60. The film 70 is deposited over the zinc sulfide film 14' by conventional evaporation techniques, briefly outlined below. The raw material comprising the film to be deposited is placed in a boat type crucible made of tantalum, tungsten or platinum. The boat is disposed toward the zinc sulfide film 14' inside a bell-jar vacuum chamber which has been pumped down to a hard vacuum of preferably about $10^{-14}$ mm. Hg. The boat is then heated to a temperature suficient to cause the raw material to evaporate and deposit on the zinc sulfide film 14'. Preferably, the film 14' is maintained at approximately room temperature. The vacuum deposition process is continued until the film 70 is deposited to the desired thickness. The substrate 16, phosphor matrix 14, and film 70 are then heated to incur the diffusion as described hereinbefore in relation to the powder method.

The invention may be operated to provide an image in any one selected color, a combination of colors to achieve a full color effect, or black and white. Any selected color image is produced in a single frame or scan by holding constant the energy in the electron beam 20. All of the selected "pure" colors are produced directly and not through combining the primary colors. The natural full-color image is produced by exciting and combining primary colors in the conventional fashion. The primary colors may be excited in frame, dot, or line sequence. A conventional black and white image may be produced on the screen 16 by sequentially exciting the blue and yellow luminescent regions of the phosphor film 14, or by sequentially exciting any other of the well-known combinations producing white.

It is to be understood that this invention may be used to detect the energy of sources other than the electron beam 20 of cathode ray tube 10. For example, the phosphor film 14 may be used to detect radiations of both the particle and low energy electromagnetic types, such as beta and alpha particles, protons and low energy gamma rays. The energies of such particles may be determined by the color of the light emission produced.

It will be apparent to those skilled in the art that the objects of this invention have been achieved by providing a single layered phosphor film which has polychromatic light emission when excited. The colors are provided by varying the concentration of the first matrix constituent relative to the second matrix constituent within the film. Energized particles such as electrons bombard the film and penetrate therein to a depth which is a function of the particle energy. The particles excite the film at the depth to which they penetrate causing light emission having a color corresponding to the relative constituent concentrations at that depth. Because the phosphor comprises a single film, fewer steps and materials are required during the manufacture. In addition, inter-layer effects are eliminated allowing improved performance. The color rendition is improved because the color is produced directly and is not necessarily the product of combining two or three primary colors.

Although this invention has been described with respect to preferred embodiments thereof, it is not to be so limited as changes and modifications may be made therein which are within the intended scope of the invention.

What is claimed is:

1. A single film activated phosphor matrix supported on a substrate for emitting light of predetermined and different colors under excitations of predetermined and different energies, said phosphor matrix consisting essentially of at least first and second matrix constituents, said phosphor matrix having a heterogeneous composition across the depth dimension thereof which progressively varies from: (1) a high concentration of said first matrix constituent relative to said second matrix constituent proximate the outer surface of said phosphor matrix which is spaced from said substrate to (2) at most a low concentration of said first matrix constituent relative to said second matrix constituent towards the inner surface of said phosphor matrix which is closer to said substrate, and the color of the light emitted under said predetermined excitations depending on the relative concentrations of said first matrix constituent to said second matrix constitutent at the depths at which said activated phosphor matrix which is excited by said predetermined excitations.

2. The combination as specified in claim 1, wherein said substrate is the screen portion of a cathode ray tube and said activated phosphor matrix is disposed on the inside surface thereof, said cathode ray tube comprising in addition to the screen portion, an envelope means, a cathode means disposed within said envelope means opposite to said screen portion for supplying an electron beam which excites said activated phosphor matrix, and means for varying the energy of the electrons in said electron beam to produce the predetermined varying energies of excitations for exciting said activated phosphor matrix.

3. The combination as specified in claim 1, wherein said first matrix constituent consists essentially of at least one material of the group consisting of CdS, and ZnSe, and said second matrix constituent consists essentially of ZnS.

4. The combination as specified in claim 3, wherein the thickness of said activated phosphor matrix is from about 100 angstroms to about 10 microns.

5. The combination as specified in claim 3, wherein said phosphor matrix is activated by at least one material of the group consisting of Ag, Cu, and Au.

6. The combination as specified in claim 3, wherein said phosphor matrix is coactivated by at least one material of the group consisting of Cl, I, Br, Al, Ga and In.

7. The combination as specified in claim 3, wherein said phosphor matrix is activated by Ag and coactivated by Cl.

8. The combination as specified in claim 3, wherein said first matrix constituent is CdS.

9. The combination as specified in claim 8, wherein the molar concentration of CdS relative to ZnS varies progressively from about 7:3 proximate the outer surface of said phosphor matrix to substantially zero towards the inner surface of said phosphor matrix.

10. The method of forming a heterogeneous phosphor matrix from a ZnS matrix film layer carried on a substrate, which method comprises:
    exposing the surface of said ZnS layer to a substance consisting essentially of at least one material of the group consisting of Cd, CdS, (Zn, Cd)S, Se, ZnSe, Zn (S, Se), (Zn, Cd)Se, Cd(S, Se), (Zn, Cd)(S, Se), and CdSe; and
    heating said ZnS layer and said substance to a predetermined temperature for a predetermined time to cause the Cd and/or Se of said substance to diffuse to a predetermined depth into said ZnS layer with the relative concentration of said Cd and/or Se progressively decreasing from the surface of said ZnS layer to the interface of said ZnS layer and said substrate and provide said heterogeneous phosphor matrix.

11. The method as specified in claim 10, wherein said ZnS layer is 2 microns thick, said substance to which said ZnS layer is exposed is powdered (30Zn, 70Cd)S activated by Ag and Cl, and said heating is at 750° C. for 10 minutes.

12. The method as specified in claim 10, wherein said ZnS layer is activated with a predetermined amount of at least one material of the group consisting of Ag, Cu, and Au, and coactivated with a predetermined amount of at least one material of the group consisting of Cl, I, Br, Al, Ga and In.

13. The method as specified in claim 10, wherein said predetermined temperature is from about 600° C. to about 1200° C. and said predetermined time is from about 1 minute to about 1 hour.

14. The method as specified in claim 10, wherein said substance is in the form of a powder placed proximate said ZnS matrix layer.

15. The method as specified in claim 10, wherein said substance is in the form of a layer deposited over said ZnS matrix layer.

References Cited

UNITED STATES PATENTS

| | | | |
|---|---|---|---|
| 3,122,670 | 2/1964 | Rudatis | 313—92 XR |
| 3,347,693 | 10/1967 | Wendland | 117—33.5 XR |

ALFRED L. LEAVITT, Primary Examiner

W. F. CYRON, Assistant Examiner